E. T. KNITTER.
WRENCH.
APPLICATION FILED JULY 7, 1920.
1,384,765.
Patented July 19, 1921.
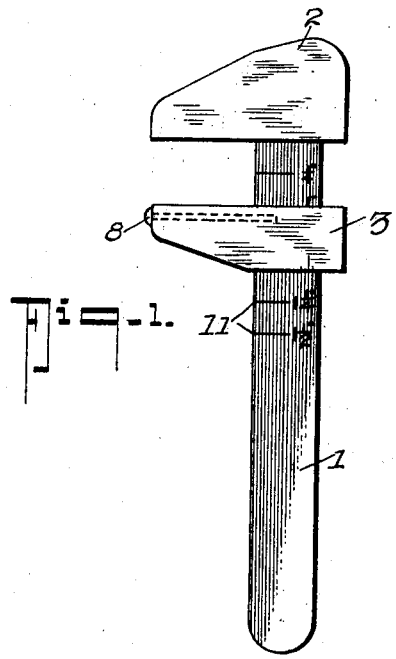
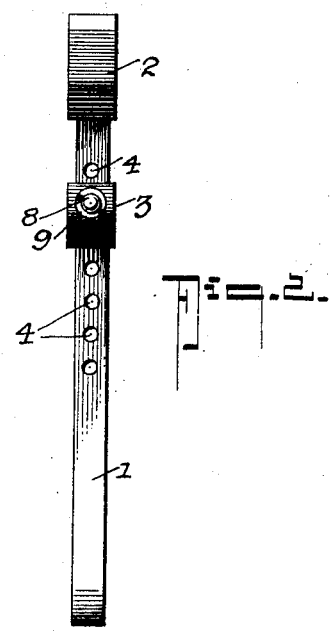
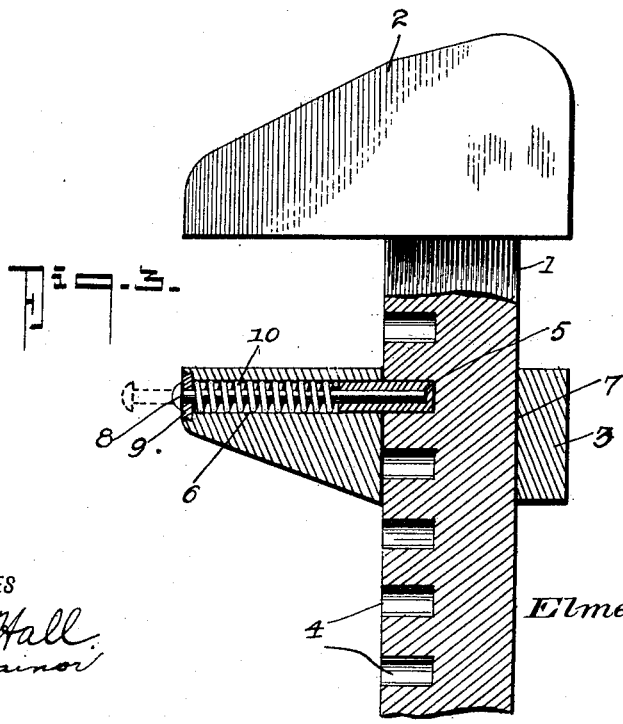
INVENTOR
Elmer T. Knitter
BY
ATTORNEYS

UNITED STATES PATENT OFFICE.

ELMER THEODORE KNITTER, OF CLEVELAND, OHIO.

WRENCH.

1,384,765.  Specification of Letters Patent.  Patented July 19, 1921.

Application filed July 7, 1920. Serial No. 394,513.

*To all whom it may concern:*

Be it known that I, ELMER THEODORE KNITTER, a citizen of the United States, and a resident of Cleveland, in the county of Cuyahoga and State of Ohio, have invented certain new and useful Improvements in Wrenches, of which the following is a specification.

My invention is an improvement in wrenches, and has for its object to provide a wrench, wherein a shank is provided, having a fixed jaw, and a movable jaw, the movable jaw and the shank having interengaging means for positively locking the movable jaw in adjusted position, and wherein the shank is calibrated for coöperating with the movable jaw as an indicator to indicate the position of the said movable jaw with respect to the fixed jaw.

In the drawings:

Figure 1 is a plan view of the improved wrench.

Fig. 2 is a rear view.

Fig. 3 is an enlarged section through a portion of the shank and the movable jaw.

In the present embodiment of the invention, a shank is provided having a suitable cross section, and provided at one end with a fixed jaw 2 which is in the form of a cross head, extending on both sides of the shank, but extending farther in one direction than in the other.

A movable jaw 3 is mounted to slide on the shank, toward and from the fixed jaw, and the said movable jaw and the shank having interengaging means for holding the movable jaw in adjusted position.

The said means consists of a series of cylindrical sockets 4 in the edge of the shank which are spaced apart from each other at regular intervals and have their axes parallel, and are adapted for engagement by a locking pin 5 mounted in the movable jaw. The movable jaw has a longitudinally extending opening 6 which intersects at its inner end the opening 7 through which the shank slides, and a rod 8 is securely connected with the pin 5, the pin having an axial opening for engagement by the rod.

This rod is guided at its outer end by means of a nut or washer 9, through which the rod extends, the nut or washer having threaded engagement with a ream or counterbore at the outer end of the opening 6. A coil spring 10 encircles the rod between the nut or washer and the locking pin 5 and normally acts to force the pin toward the shank, and to hold it in engagement with one of the sockets 4. The shank is calibrated, or provided with graduations 11, which have indicating numerals as shown, which indicate the size of the nut that will be received between the jaws, when the movable jaw is in register with the calibration bearing the numerals.

The nut or washer 9 has a transverse or diametrical kerf in its outer face, for engagement by a screw driver or the like to turn the same. The parts are assembled as follows, first the parts of the locking pin, with the washer and spring in place are assembled, and inserted in the movable jaw, after the said jaw has been placed on the shank. When the washer is turned into place the device is assembled and ready for use. In order to use the wrench, the head of the pin 8 is grasped, and the locking pin is drawn outwardly against the resistance of the spring 6. The movable jaw is moved to the proper point on the shank, to receive the size of nut which it is intended to engage, the proper point being indicated by the scale. When the locking pin is released, the movable jaw is locked firmly to the shank, at the required distance from the fixed jaw and it is positively held in this position, without any possibility of accidental release.

As illustrated in detail in Fig. 3 the locking member 5 which is slidable in the opening 6 is urged into one of the pockets 4 so as to provide a positive connection between the sliding jaw and the shank. This positive connection provided by the locking member prevents the endwise movement of the sliding jaw in either direction. Therefore, when the jaw 3 is in an adjusted position as illustrated in Fig. 3, it is prevented from being moved either in the direction of the stationary jaw 2 or away from it.

The rod 8 which constitutes means for operating the locking member 5 or more specifically for removing the same from the socket 4 is urged inwardly in the direction of the shank by means of the coiled spring 10. By reason of this construction the rounded head of the rod 8 is urged toward the nut and should the rounded head come in contact with the work in the operation of the wrench, the position of the locking member 5 will not be altered. In other words, the locking member 5 is not removed from the socket within which it is inserted should the head of the operating member or rod 8 become engaged with the work operated on by the wrench.

I claim:

1. A wrench comprising a shank having spaced sockets, a jaw slidable on said shank and having an opening extending out through one end, a pin slidable in said opening and adapted to extend into said sockets whereby to hold the jaw against sliding movement in either direction, a rod connected to said pin and having a head arranged exteriorly of the jaw, a nut threaded on said jaw, a spring confined between said nut and said pin and urging the head of said rod in the direction of said jaw and urging said pin into one of said sockets, and a fixed jaw connected to said shank.

2. A wrench comprising a shank having spaced sockets along one longitudinal edge, a jaw slidable on said shank, and having an opening extending out through one end, a locking member slidable in said opening and adapted to extend into one of said sockets whereby to positively hold the jaw against sliding movement in either direction, a nut threaded in said jaw, a coiled spring confined between said locking member and said nut and urging said locking member into one of said sockets, and an operating device connected to said locking member and slidable through said nut.

ELMER THEODORE KNITTER.